United States Patent [19]
Clement

[11] Patent Number: 5,957,353
[45] Date of Patent: Sep. 28, 1999

[54] SKI RACK

[76] Inventor: Robert L. Clement, 132 Allyn Rd., West Goshen, Conn. 06756

[21] Appl. No.: 08/895,606

[22] Filed: Jul. 16, 1997

[51] Int. Cl.[6] .......................................................... B60R 7/08
[52] U.S. Cl. .......................... 224/546; 224/543; 224/564; 224/571; 224/917.5; 211/60.1; 211/70.5
[58] Field of Search ..................... 224/400, 401, 224/402, 405, 406, 42.31, 42.32, 42.33, 539, 540, 543, 545, 546, 555, 557, 564, 565, 567, 571, 917.5; 211/60.1, 62, 63, 64, 70.5, 70.8

[56] References Cited

U.S. PATENT DOCUMENTS

| | | | |
|---|---|---|---|
| 2,439,623 | 4/1948 | Howells | 224/557 |
| 3,294,247 | 12/1966 | Norrington | 224/546 |
| 3,330,573 | 7/1967 | Sieloff | 211/70.5 |
| 3,527,354 | 9/1970 | Sokolow | 211/70.5 |
| 3,746,224 | 7/1973 | Folgner . | |
| 4,271,997 | 6/1981 | Michael . | |
| 4,330,065 | 5/1982 | Haddad . | |
| 4,469,257 | 9/1984 | Parker . | |
| 4,582,015 | 4/1986 | Hunter . | |
| 5,105,754 | 4/1992 | Collins . | |
| 5,524,772 | 6/1996 | Simmons | 224/546 |
| 5,647,489 | 7/1997 | Bellis, Jr. | 224/546 |

FOREIGN PATENT DOCUMENTS 309846  7/1933  Italy ........................................ 211/70.5

*Primary Examiner*—Gregory M. Vidovich
*Attorney, Agent, or Firm*—McCormick, Paulding & Huber

[57] ABSTRACT

A ski rack particularly suitable for use within an automobile and about a wheel well protruding within the automobile. The ski rack includes a rear rack portion having a rear frame to be positioned in an automobile over an area typically occupied by a rear wheel well. The rear frame is supported by at least one of the sidewall and floor of the automobile. A rear ski support member extends upwardly from the rear frame to support skis at one end. A front rack portion has a front ski support member to be attached to a front sidewall to support skis at another end. The ski rack may further include support members to be inwardly offset from a rear wheel well protruding within the automobile for maintaining ski poles in a fixed position close to the sidewall so as not to encroach into the automobile passenger and cargo space.

4 Claims, 5 Drawing Sheets

SKI RACK

The present invention relates to ski racks, and more particularly to a ski rack which is particularly suitable for use within an automobile.

BACKGROUND OF THE INVENTION

Ski racks are typically placed on the roofs of automobiles, such as cars and vans, in order to preserve ample space within the automobile for passenger room and other cargo. Unfortunately, the height and location of the roof-mounted ski racks make accessing the racks difficult. For example, a skier typically has to open an automobile door and stand on the floor of the automobile while straddling the side and roof of the automobile in order to position and fasten the ski racks over the roof.

Some ski racks are positioned at a more accessible location on the automobile. For example, U.S. Pat. No. 4,469,257 to Parker shows a ski rack device which is positioned over a wheel well in the bed of a pickup truck with pairs of skis horizontally spaced from one another. Such an arrangement, however, is impractical within an automobile where space is at a premium because the horizontally spaced skis will tend to encroach on a passenger's seat space. Another drawback is that the outside location of the ski rack makes the skis maintained thereon easily accessible to potential thieves. U.S. Pat. No. 4,271,997 to Michael shows a ski rack adapted for use in a van. Front and back brackets are used to support skis against a wall of the van. However, such an arrangement cannot be employed where the van has a rear wheel well encroaching the space on the sidewall where one of the brackets is to be mounted.

It is therefore an object of the present invention to provide a ski rack to be mounted within an automobile which avoids the drawbacks and disadvantages of the prior art references.

SUMMARY OF THE INVENTION

The present invention resides in a ski rack particularly suitable for use in an automobile having rear wheel wells positioned inwardly of the rear sidewalls of the automobile. The ski rack comprises a rear rack portion including a rear frame to be positioned in an automobile over an area typically occupied by a rear wheel well. The rear frame defines first and second side members, and frontward and rearward members. The first side member is to be positioned inside an automobile adjacent a rear side wall and the second side member is to be inwardly positioned in the automobile relative to the first side member. The rear frame is supported by at least one of the sidewall and floor of the automobile. A rear ski support member extends upwardly from the rear frame. The rear ski support member includes a series of vertically spaced first support surfaces projecting from the rear ski support member. Each of the first support surfaces serves to support one end of a pair of skis to be positioned adjacent a sidewall within the automobile. A front rack portion has a front ski support member to be attached to a front sidewall on the same side of an automobile as the rear rack portion. The front ski support member includes a series of vertically spaced second support surfaces projecting from the front ski support member. Each of the second support surfaces serves to support a second end of a pair of skis.

The ski rack may further include one or more support members coupled to the rear frame and to be inwardly offset from a rear wheel well protruding within the automobile for maintaining ski poles in a fixed position close to the sidewall so as not to encroach into the automobile passenger and cargo space.

One advantage of the present invention is that the ski rack is not impeded by a rear wheel well projecting inwardly from a sidewall within an automobile.

Another advantage of the present invention is that skis and ski poles are maintained in position in close proximity with an inner sidewall of an automobile, and thus do not encroach into passenger and cargo space.

Other objects and advantages of the present invention will become apparent in view of the following detailed description and accompanying drawings.

DETAILED DESCRIPTION OF THE PREFERRED EMBODIMENT

Figure 1:
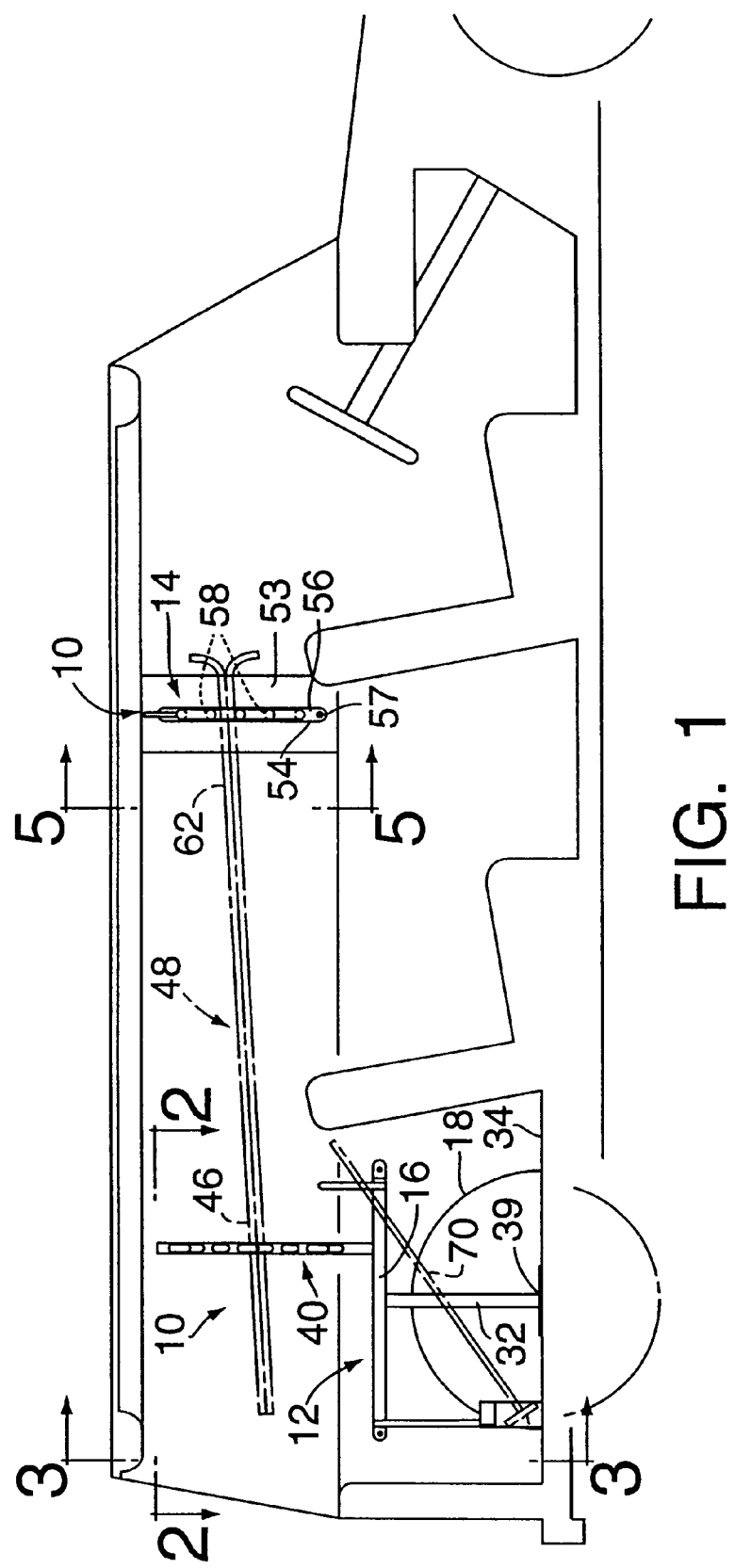
FIG. 1 is a side elevational view of a ski rack mounted within a van in accordance with h present invention.
Figure 2:
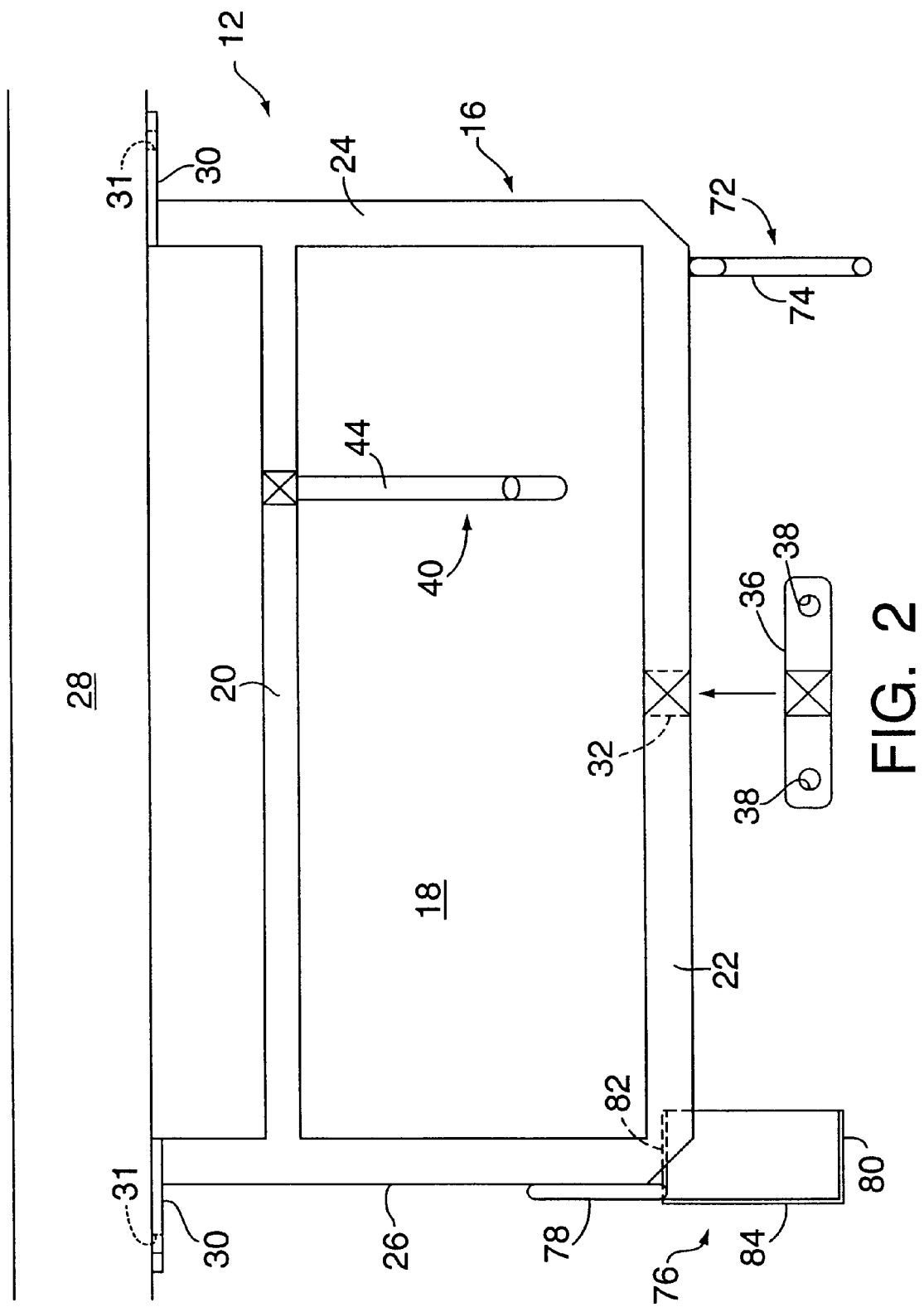
FIG. 2 is a top plan view of the rear rack portion taken along the lines 2—2 of FIG. 1.

Referring to FIG. 1, a ski rack particularly suitable for use inside an automobile or van having rear wheel wells projecting inwardly of the rear sidewalls is generally designated by the reference number 10. The ski rack 10 comprises a rear rack portion 12 and a front rack portion 14. The rear rack portion 12 includes a rear frame 16, made of metal or a durable plastic material, which can be positioned over an inwardly projecting wheel well 18 of an automobile such as a car, or more typically, a van. As best shown in FIG. 2, the rear frame 16 is shaped as a closed loop which is positioned to overhang or extend over the rear wheel well 18 of the automobile. The rear frame defines first and second side members 20 and 22, and frontward and rearward members 24 and 26, respectively. More specifically, the first side member 20 is positioned generally adjacent to an inner surface of a rear sidewall 28, and the second side member is positioned to extend over or overhang the rear wheel well 18. The rear frame 16 may include means for attaching the frame to the sidewall, such as brackets 30, 30 extending from the first side member 20. The brackets define slots 31, 31 to receive screws, bolts or the like for securely attaching the rear frame 16 to the rear sidewall 28. A frame support 32 (shown in FIG. 1) may be interposed between the rear frame 16 and a floor 34 of the automobile in order to securely maintain the rear frame 16 in position over the rear wheel well 18. As shown in FIG. 2, a support bracket 36 having mounting holes 38, 38 for screws, bolts, or the like, is preferably provided to engage and securely attach a bottom end 39 (see FIG. 1) of the frame support 32 to the automobile floor.

Figure 3:
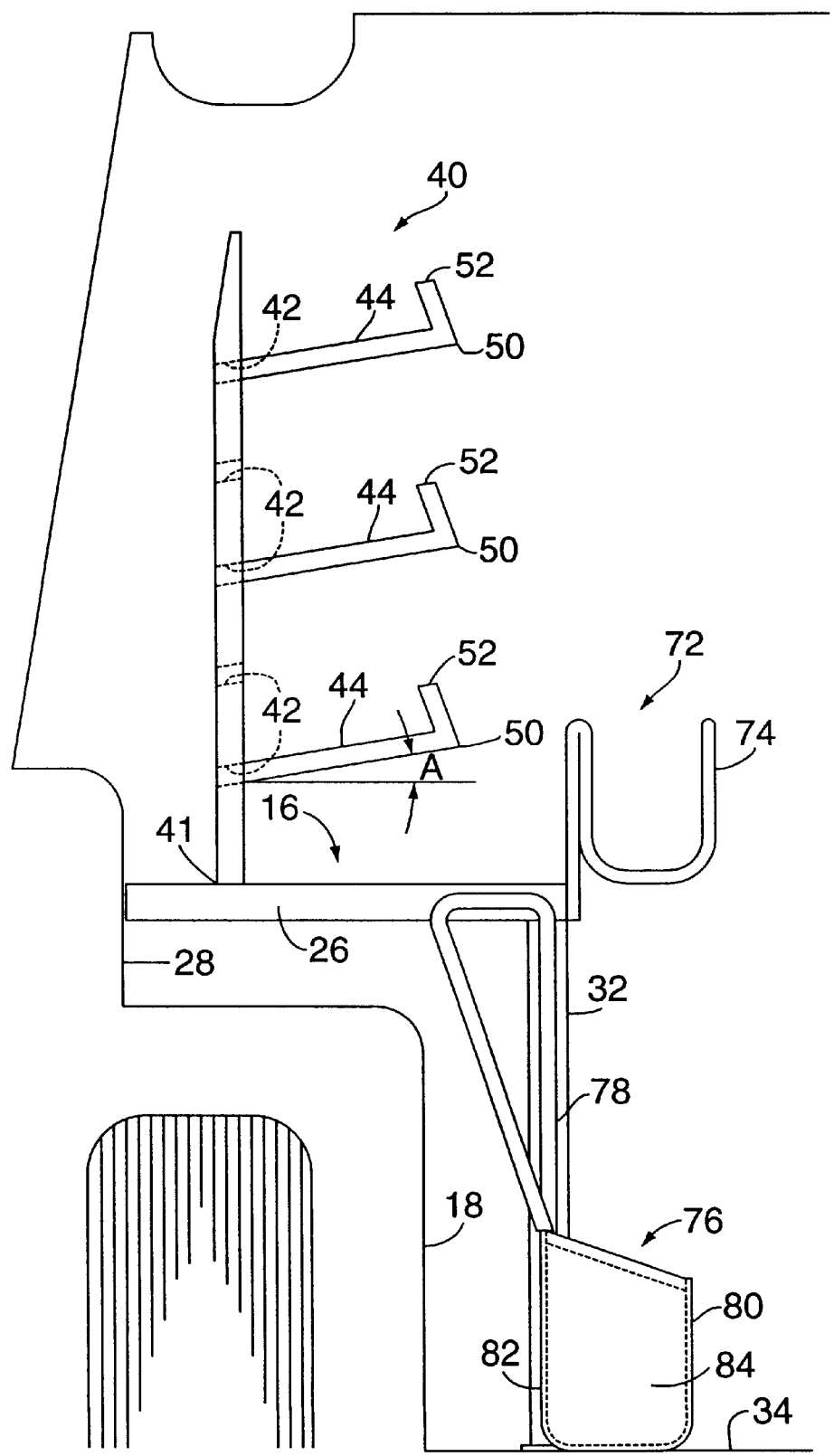
FIG. 3 is a view of the rear rack portion taken along the line 3—3 of FIG. 1.
Figure 4:
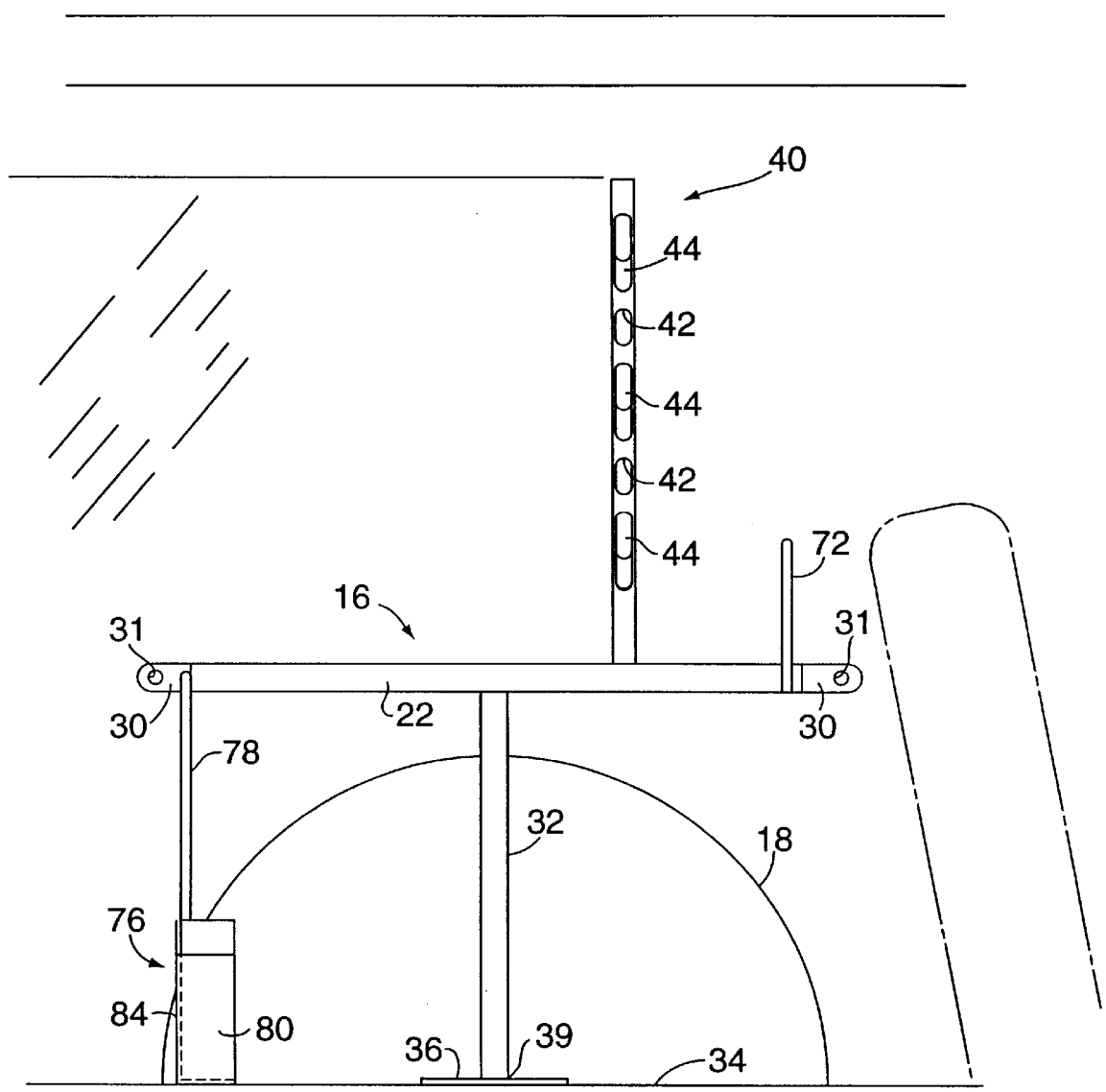
FIG. 4 is an enlarged side elevational view of the rear rack portion of the ski rack of FIG. 1.

As shown in FIG. 3, the rear rack portion 12 further includes a rear ski support member 40 extending upwardly from the rear frame 16. Preferably, a base 41 of the rear ski support member 40 is attached to the rear frame 16 at the first side member 20 so that the rear ski support member 40 is closely spaced inwardly from the rear side wall 28. The rear ski support member 40 is preferably positioned in close proximity to the rear sidewall 28 so that any skis placed on the rear ski support member are close to the rear sidewall, and thus do not interfere with the passenger and cargo space within the automobile. The inside location of the ski rack offers greater security compared to outside or roof racks. Further, the elevated location of the ski rack prevents the skis from coming into contact with and otherwise being possibly damaged by luggage thrown onto skis typically placed on the floor of the automobile. Referring to FIG. 4, the rear ski support member 40 includes a series of vertically spaced slots 42, 42 and one or more first support surfaces or brackets 44, 44 selectably releasably received in a slot 42 at a desired elevation. Each of the first support surfaces 44 supports one end of a pair of skis, such as a first end 46 of skis 48 shown in FIG. 1. The first support surfaces 44 project from the support member 40 preferably at a slightly inclined angle A, as shown in FIG. 3, in order to prevent the skis from falling off a free end 50 of the first support surface 44 and to maintain the skis in close proximity with the rear sidewall. The first support surface 44 may also define a generally upwardly extending stop surface 52 at the free end 50 to further prevent skis from slipping off the first support surface 44. The rear rack portion 12 is thus adapted to be used in an automobile having a rear wheel well projecting inwardly within an inner sidewall. Although the rear rack portion 12 is mounted about a rear wheel well, as shown in FIG. 3, the rear rack portion 12 may be installed in areas that are not limited by wheel wells.

Figure 5:
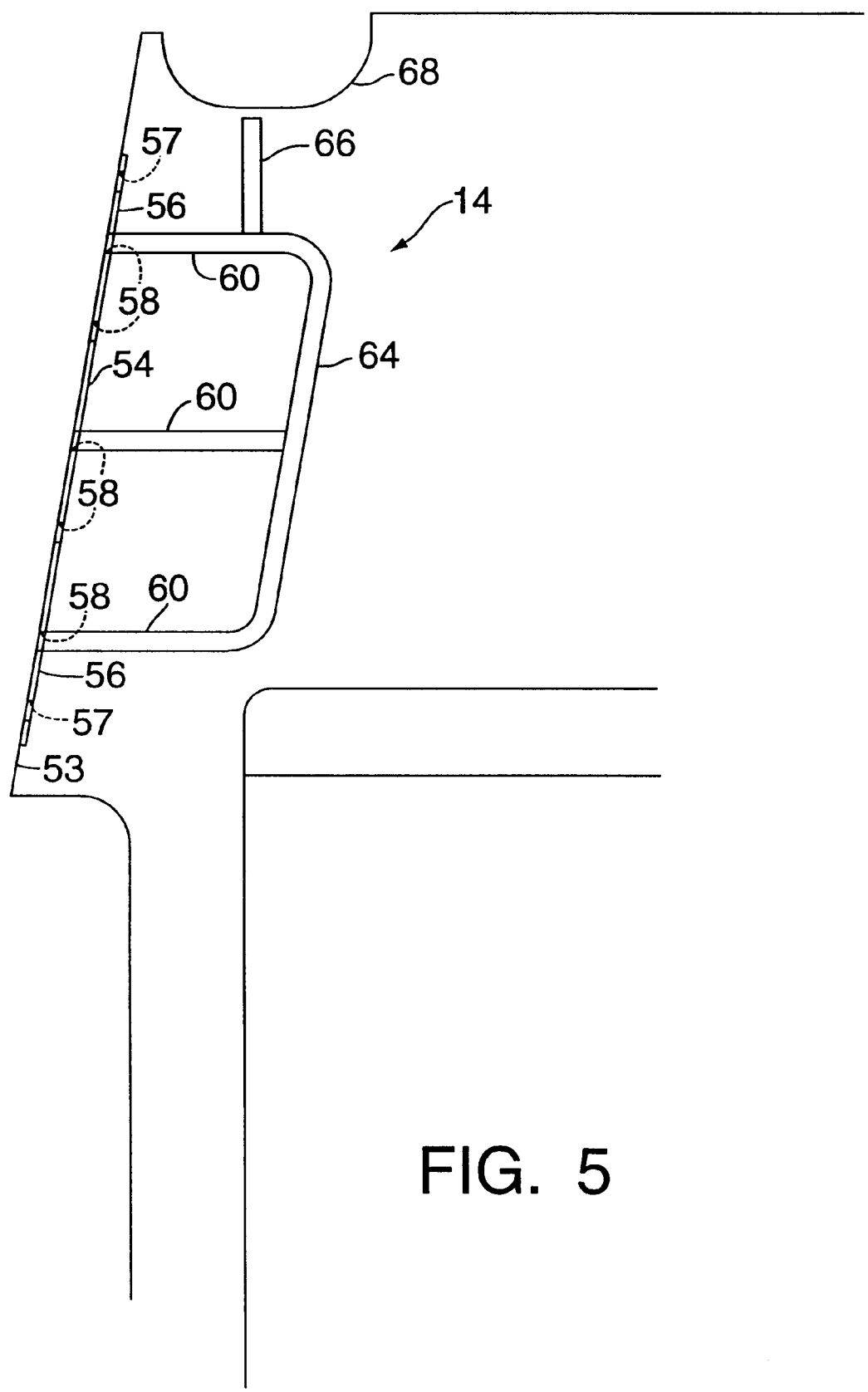
FIG. 5 is a view of the front rack portion of the ski rack taken along the lines 5—5 of FIG. 1.

Turning now to FIGS. 1 and 5, the front rack portion 14 is positioned on a front sidewall 53 on the same side of the automobile as the rear rack portion 12. As shown in FIG. 5, the front rack portion 14 includes a front ski support member 54 having upper and lower longitudinal ends 56, 56 each defining slots 57, 57 to receive screws, bolts and the like for attaching the front ski support member 54 to the front sidewall 53. The front ski support member 54 also includes a series of vertically spaced slots 58, 58 and one or more second support surfaces or brackets 60, 60 selectably releasably received in a slot 58 at a desired elevation. Each of the second support surfaces 60 supports another end of a pair of skis, such as the second end 62 of the skis 48 shown in FIG. 1. The second support surfaces 60, 60 may project from the front ski support member 54 at a slightly inclined angle (not shown) in order to maintain the skis in close proximity to, the front sidewall 53. Alternatively, as shown in FIG. 5, the second support surfaces 60, 60 may include stop surfaces 64, 66 to prevent the second end of skis from falling off the second support surfaces 60, 60. With reference to FIG. 5, the stop surfaces 64, 66 cooperate with one another, the second support surfaces 60, 60 and a ceiling 68 of the automobile to define a perimeter surface which surrounds and maintains in position the ends of skis positioned on the second support surfaces 60, 60 to virtually eliminate the dangerous possibility of the skis slipping off the front rack portion 14 and hitting the automobile driver.

As can be seen in FIGS. 3 and 5, any skis supported on the first and second support surfaces 44 and 60 of the ski rack 10 are located in close proximity to the sidewall, and thus do not encroach into the passenger and cargo space within the automobile. Further, the ski rack 10 itself is not impeded by a rear wheel well which may project inwardly from a sidewall of the automobile.

The ski rack 10 further provides means for maintaining ski poles, such as ski poles 70 shown in FIG. 1, in a fixed position and in close proximity to a rear sidewall within the automobile so as not to encroach into the passenger and cargo space. With reference to FIG. 3 and 4, the rear rack portion 12 includes a third support member 72 coupled to the rear frame 16. More specifically, the third support member 72 is coupled to the second side member 22 of the rear frame 16 so as to be inwardly offset from the rear wheel well 18. Preferably, the third support member 72 is formed in the shape of a loop 74 which is upwardly open-ended. Ski poles may then be propped-up in a fixed position by resting a lower end of the ski poles on a floor of the automobile and inserting an upper end of the ski poles through the open end of the loop 74 so that the upper end of the ski poles are cradled therein.

The rear rack portion 12 may further include a fourth support member 76 to be positioned near the floor of the automobile for supporting a lower end of the ski poles. The fourth support member 76 is coupled to and fixed in position with respect to the rear frame 16 by means of a rigid connecting member 78. As can be seen in FIG. 3, the fourth support member is preferably inwardly offset from the rear wheel well 18, and is in the shape of a cup which is open-ended in a frontward direction of the automobile so that the lower ends of ski poles may be received through the open end of the fourth support member and maintained in position by side and rear surfaces 80, 82 and 84 of the fourth support member. Because the third and fourth support members are slightly inwardly offset from the rear wheel well, the ski poles may be maintained in close proximity to the rear wheel well 18, and thus do not encroach into the passenger and cargo space of the automobile.

While the present invention has been described in preferred embodiments, it will be understood that numerous modifications and substitutions can be made without departing from the spirit or scope of the invention. Accordingly, the present invention has been described in a preferred embodiment by way of illustration, rather than limitation.

What is claimed is:

1. A ski rack for use in an automobile having rear wheel wells projecting inwardly of the rear sidewalls of the automobile, the ski rack comprising:

a rear rack portion including:

a rear frame to be positioned within the automobile over an area occupied by one of the rear wheel wells, the rear frame defining first and second side members, and frontward and rearward members, the first side member to be positioned inside the automobile adjacent one of the inner side walls associated with the one rear wheel well and the second side member to be inwardly offset relative to the first side member so as to overhang the area occupied by the one rear wheel well, the rear frame supported by at least one of the one inner sidewall and the floor of the automobile; and a rear ski support member extending upwardly from the rear frame, the rear ski support member including a series of vertically spaced first support surfaces projecting from the rear support member, each of the first support surfaces for supporting one end of a pair of skis to be positioned adjacent the one inner sidewall within the automobile;

a third support member coupled to the rear frame and to be inwardly offset from the area occupied by the one rear wheel well for supporting elevated ends of ski poles;

means coupled to the rear frame at a lower position relative to the third support member for retaining in a fixed position lower ends of ski poles, the retaining means being generally in the shape of a cup to be open-ended in a frontward direction of the automobile, and positioned near the floor of the automobile; and a front rack portion having a front ski support member to be attached to the one inner sidewall forwardly of the automobile on the same side of the automobile as the rear rack portion, the front ski support member including a series of vertically spaced second support surfaces projecting from the front ski support member, each of the second support surfaces for supporting another end of the pair of skis.

2. A ski rack for use in an automobile having rear wheel wells projecting inwardly of the rear sidewalls of the automobile, the ski rack comprising:

a rear rack portion including:

a rear frame generally in the form of a rectangular loop to be positioned within the automobile over an area occupied by one of the rear wheel wells, the rear frame defining first and second side members, and frontward and rearward members, the first side member to be positioned inside the automobile adjacent one of the inner side walls associated with the one rear wheel well and the second side member to be inwardly offset relative to the first side member so as to overhang the area occupied by the one rear wheel well, the rear frame supported by at least one of the one inner sidewall and the floor of the automobile; and a rear ski support member extending upwardly from the rear frame, the rear ski support member including a series of vertically spaced first support surfaces projecting from the rear support member, each of the first support surfaces for supporting one end of a pair of skis to be positioned adjacent the one inner sidewall within the automobile; and a front rack portion having a front ski support member to be attached to the one inner sidewall forwardly of the automobile on the same side of the automobile as the rear rack portion, the front ski support member including a series of vertically spaced second support surfaces projecting from the front ski support member, each of the second support surfaces for supporting another end of the pair of skis.

3. A ski rack for use within an automobile having rear wheel wells projecting inwardly of the inner rear sidewalls of the automobile, the ski rack comprising:

a rear rack portion including:

a rear frame to be positioned within the automobile over an area occupied by one of the rear wheel wells, the rear frame defining first and second side members, and frontward and rearward members, the first side member to be positioned inside the automobile adjacent one of the inner side walls associated with the one rear wheel well and the second side member to be inwardly offset relative to the first side member so as to overhang the area occupied by the one rear wheel well, the rear frame supported by at least one of the one inner sidewall and the floor of the automobile; and a rear ski support member extending upwardly from the rear frame, the rear ski support member including a series of vertically spaced first support surfaces projecting from the rear support member, each of the first support surfaces for supporting one end of a pair of skis to be positioned adjacent the one inner sidewall of the automobile;

a front rack portion having a front ski support member to be attached to the one inner sidewall forwardly in the automobile on the same side of the automobile as the rear rack portion, the front ski support member including a series of vertically spaced second support surfaces projecting from the front ski support member, each of the second support surfaces for supporting another end of the pair of skis; and a frame support extending downwardly from the rear frame, the frame support to be interposed between and to contact the rear frame and the automobile floor for bracing the rear frame in a raised position relative to the floor.

4. A ski rack for use within an automobile having rear wheel wells projecting inwardly of the inner rear sidewalls of the automobile, the ski rack comprising:

a rear rack portion including:

a rear frame to be positioned within the automobile over an area occupied by one of the rear wheel wells, the rear frame extending from one end adjacent one of the inner side walls associated with the one rear wheel well and terminating at a second end inwardly offset relative to the one end so as to overhang the area occupied by the one rear wheel well, the rear frame supported by at least one of the one inner sidewall and the floor of the automobile; and a rear ski support member extending upwardly from the rear frame, the rear ski support member including a series of vertically spaced first support surfaces projecting from the rear support member, each of the first support surfaces for supporting one end of a pair of skis to be positioned adjacent the one inner sidewall of the automobile;

a front rack portion having a front ski support member to be attached to the one inner sidewall forwardly in the automobile on the same side of the automobile as the rear rack portion, the front ski support member including a series of vertically spaced second support surfaces projecting from the front ski support member, each of the second support surfaces for supporting another end of the pair of skis; and a frame support extending downwardly from the rear frame, the frame support to be interposed between and to contact the rear frame and the automobile floor for bracing the rear frame in a raised position relative to the floor.

* * * * *